United States Patent [19]

Taylor et al.

[11] 4,046,396
[45] Sept. 6, 1977

[54] HEAVY DUTY DIRT BICYCLE AND FRAME THEREFOR

[76] Inventors: James Michael Morrison Taylor, 3404 Castor St., Santa Ana, Calif. 92704; Gene R. Troke, 15343 Illinois Ave., Paramount, Calif. 90723

[21] Appl. No.: 661,362

[22] Filed: Feb. 25, 1976

[51] Int. Cl.² ............................................. B60K 25/04
[52] U.S. Cl. ................................ 280/281 R; 280/259; 280/279; 280/284
[58] Field of Search .................... 280/281 R, 259, 270, 280/274, 279, 280, 284

[56] References Cited

U.S. PATENT DOCUMENTS

| 478,391 | 7/1892 | Bolte ................................ 280/281 R |
| 604,724 | 5/1898 | Case .................................... 280/280 |
| 1,947,631 | 2/1934 | Whidden ............................. 280/280 |
| 3,931,990 | 1/1976 | Knapp ........................ 280/281 R X |

FOREIGN PATENT DOCUMENTS

| 488,463 | 11/1952 | Canada ................................. 280/259 |
| 8,387 | 3/1894 | United Kingdom ............. 280/281 R |
| 15,332 | 11/1915 | United Kingdom ................. 280/284 |
| 20,712 | 8/1896 | United Kingdom ............. 280/281 R |

*Primary Examiner*—Philip Goodman
*Assistant Examiner*—Terrance L. Siemens
*Attorney, Agent, or Firm*—Gary Appel

[57] ABSTRACT

A heavy duty off-pavement or dirt bicycle and frame therefor, includes a rear wheel frame portion having a metal alloy, tubular main frame member formed into a broad V-shape, a lower arcuate portion thereof being normally, in use, the lowest part of the frame. A tubular crank hub, having an axis orthogonal to the plane of the main frame member, is welded to an inner, forward side of such member, upwardly from the bottom thereof, so that the hub is within the confines of the main frame member and is protected thereby from damaging contact with large rocks, curbs, etc. The continuous nature of the main frame member greatly increases the strength of the rear frame portion over similar, sectioned frames. A socket joined to the upper forward end of the main frame member, pivotally mounts a front wheel fork assembly. Each of two elongate, tubular front wheel mounting members of the front fork assembly has disposed therewithin a longitudinally formed, elongate angle, resulting in greatly increased resistance of the members to bending or breaking in use. A rear wheel fork assembly is pivotally mounted, at a forward end, to the main frame member at the hub, and at an upper region to a shock absorber whose forward end is pivotally mounted to the main frame member rearwardly of the front fork assembly mounting socket. Two variations of the rear wheel frame portion are also illustrated and described.

1 Claim, 11 Drawing Figures

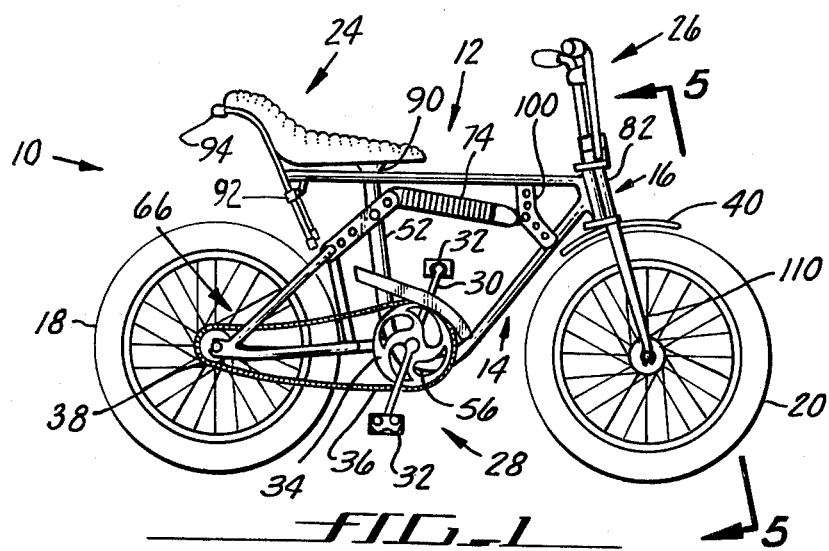
FIG_1
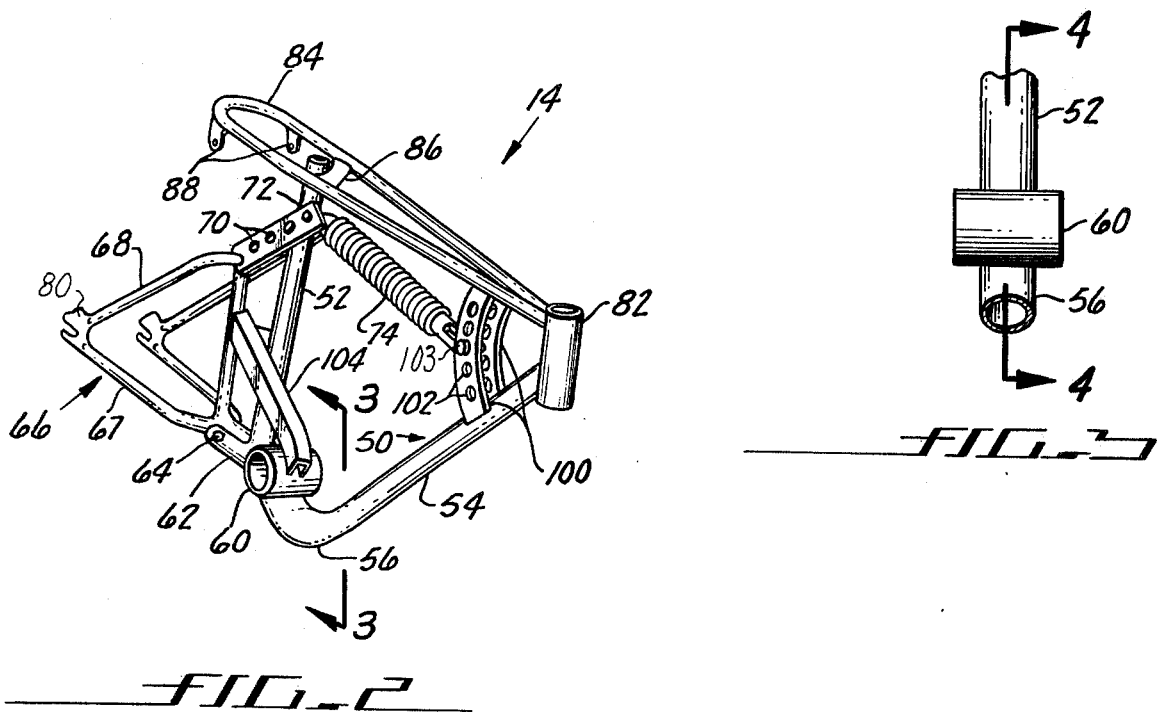
FIG_2
FIG_3
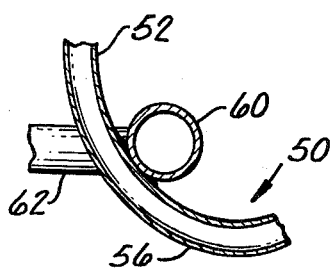
FIG_4

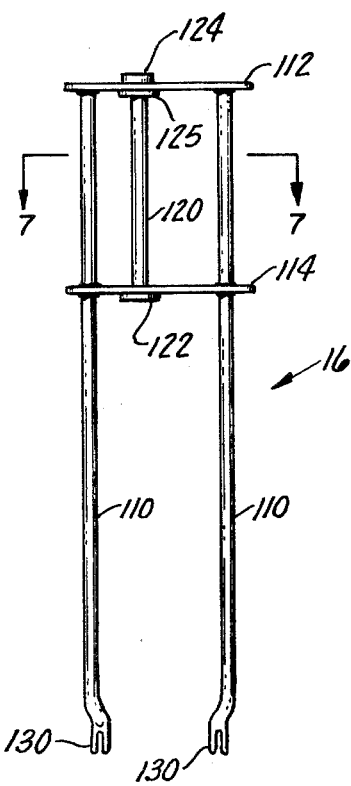
FIG_6
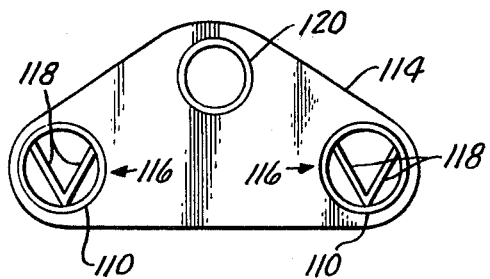
FIG_7
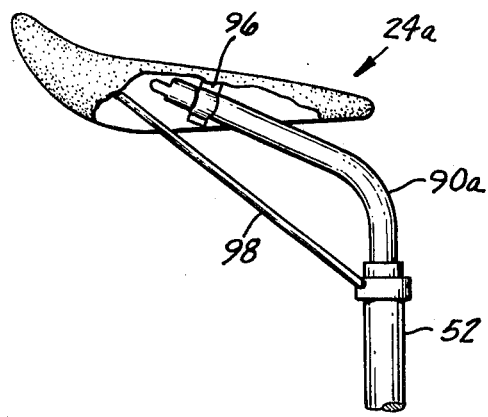
FIG_5
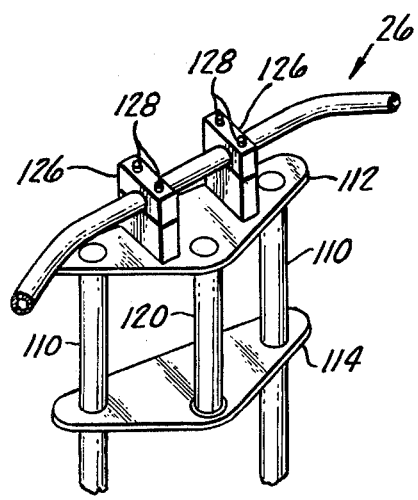
FIG_8

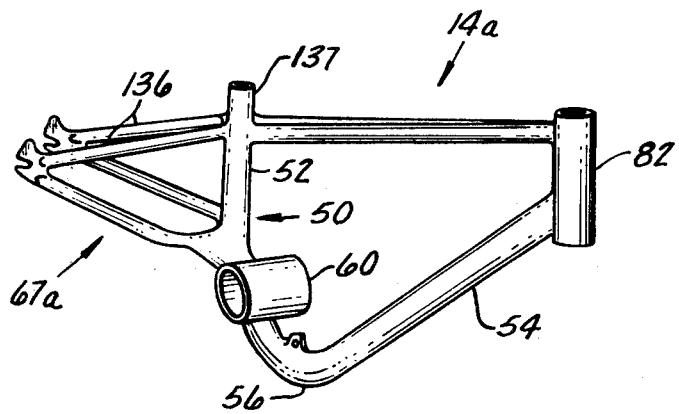
FIG_9
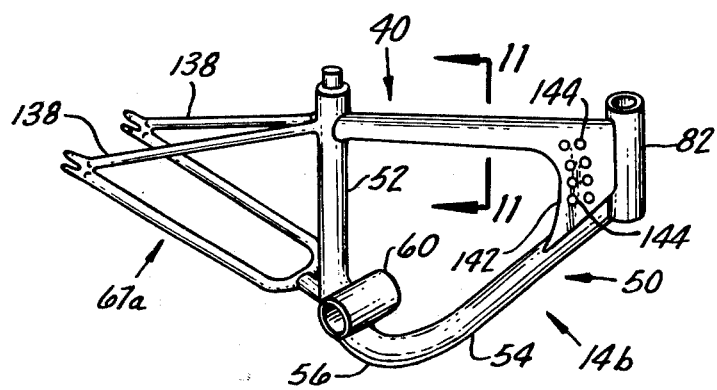
FIG_10
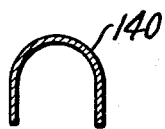
FIG_11

HEAVY DUTY DIRT BICYCLE AND FRAME THEREFOR

BACKGROUND OF THE INVENTION

1. Field of the Invention

The present invention relates to the field of bicycles and more particularly to off-pavement or dirt bicycles and frames therefor.

2. Discussion of the Prior Art

Oweing in large part to the current great popularity of off-road or "dirt" motorcycles for adults and older teenagers, there has arisen a corresponding popularity with youngsters for bicycles which duplicate or simulate many features of such motorcycles. These special bicycles, which are particularly designed for rough, off-pavement use on vacant lots and hillsides, enable those too young to use motorcycles, or those whose parents either cannot afford expensive motorcycles or consider motorcycles too dangerous for youngsters, to enjoy at least some of the thrills and excitement of dirt cycling and motocross racing competition.

In addition to being safer for youngsters than motorcycles and much less costly, these so-called dirt bicycles have further advantages in that they can be ridden on streets like conventional bicycles and can be used in urban and suburban areas where dirt motorcycling is prohibited because of noise, lack of space, etc. Thus, even though a youngster may own or have access to a dirt motorcycle, for more frequent and convenient use he may also want a dirt bicycle.

While conventional bicycles are generally subject to frequent hard abuse, dirt bicycles are subjected to even more severe hard use, for example, when the rider leaps it into the air, jumps ruts and ditches with it and rides it over rock strewn ground, not to mention frequently dumping it when spills are taken.

Therefore, dirt bicycles in particular must be constructed in an extremely rugged manner to assure a reasonable usage life. Nevertheless, they must be made reasonably light weight so they may be easily handled by fairly young children, and they must be priced competitively with conventional bicycles, as most parents are usually unable or unwilling to pay much more than conventional bicycle prices just so their children can play at motorcycling. Still further, although the dirt bicycles must be ruggedly built, and are preferably constructed to look at least somewhat like a motorcycle, they must still have a pleasing appearance—that is, they cannot be constructed having all sorts of unsightly braces and trusses to give them additional strength.

As a result of such off-pavement rough usage, many construction techniques used for regular bicycles are unsuitable for dirt bicycles. At least two portions of the bicycle frames are particularly vulnerable to damage or failure. One of these regions is that of the crank hub. Ordinarily, this hub is positioned at a lower corner of a generally triangular frame, and usually tubular frame members are welded directly to the hub or to hub sockets so that the hubs are also a major frame joint. Because of great stress concentration at the hub region and non-continuity of the frame in this region, such type frames when subject to severe stresses, often crack or break at the hub attachment welds or require unsightly gusseting in this area. In the event of complete frame breakage at this point, the rider may be severely injured. In addition, because the hub is at a lowest point of the frame—that is, normally closer to the ground than adjacent frame portions—it is susceptible to easy damage by large rocks or high curbs. Also, in off-pavement use, this type hub may be frequently dragged in the dirt, with the result that sand and grit will get into the crank bearings and cause bearing failure.

The second region of common frame failure is the front wheel fork. Whereas the rear wheel support is fairly rugged, the cantilevered front wheel fork is comparatively fragile and yet it is subjected to very high bending stresses in the swivel attachment region, particularly when the bicycle is jumped and lands on the front wheel. Bending of the fork causes the front wheel to be misaligned and may cause spills; complete or partial breaking of the fork in use can result in severe rider injury.

Heretofore, in most cases, attempts to increase the strength of these critical frame portions for dirt bicycles have resulted in excessively heavy, expensive and/or unsightly bicycles, and frame improvements, particularly in heavy-duty frames for dirt-type bicycles, are necessary.

SUMMARY OF THE INVENTION

A heavy-duty dirt bicycle comprises a front and a rear wheel, a handle bar, a seat and a seat mounting rear frame having a continuous main frame member with an elongate upwardly and rearwardly projecting first portion, an upwardly and forwardly projecting second portion and an arcuate intermediate portion joining the first and second portions into a planar, generally broad V-shaped structure. A rear wheel drive means includes a pedal crank hub, having its axis orthogonal to the plane of the main frame member, and which is joined to a forward facing surface of the main frame member relatively adjacent to the intersection of the first and intermediate portions and relatively remote from the lowest point of the intermediate portion, the hub being thereby located within the confines of the main frame member and protected thereby from damage during use on a bicycle.

A swivel socket is joined to an upper end of the second main frame portion for pivotally mounting a pivot tube of a front wheel, handlebar mounting fork assembly. Each of a pair of tubular front wheel mounting members of the front wheel fork assembly has disposed internally an elongate, longitudinally formed angle or girder which greatly increases the bending strength of such members thereby permitting the use of lightweight metal alloys of a relative wall thickness heretofore incompatible with the stresses associated with dirt bicycle design and motocross bicycle racing.

A rear wheel mounting fork assembly is pivotally mounted, at a forward end, to the main frame member and hub, and at an upper portion to a rearward end of a shock absorber, the forward end of which is pivotally mounted to other portions of the frame near the front wheel fork mounting socket.

Because of the continuous main frame member, the protected nature of the crank hub and the reinforced front wheel mounting members, the frame is extremely rugged and capable of withstanding considerable abuse on an off-pavement or dirt bicycle without being excessively heavy or costly and while retaining an attractive appearance.

BRIEF DESCRIPTION OF THE DRAWINGS

A better understanding of the present invention may be had from a consideration of the following detailed description, taken in conjunction with the accompanying drawings in which:

FIG. 1 is a side elevational view of an off-pavement or dirt bicycle having a heavy duty frame;

FIG. 2 is a perspective view, showing a rear portion of the heavy duty frame;

FIG. 3 is a vertical sectional view along line 3—3 of FIG. 2, showing mounting of the crank hub to a main frame member;

FIG. 4 is a sectional view along line 4—4 of FIG. 3, also showing mounting of the crank hub to the frame member;

FIG. 5 is a partial cutaway view of an alternate seat assembly;

FIG. 6 is a generally vertical view along line 5—5 of FIG. 1, showing the front wheel fork assembly;

FIG. 7 is a generally horizontal sectional view along line 7—7 of FIG. 6, showing internal reinforcement girders of the front wheel fork members;

FIG. 8 is a perspective view, showing attachment of the handle bars to the front wheel fork assembly;

FIG. 9 is a perspective view of a first variation high strength rear frame portion without a shock mounted rear wheel fork assembly;

FIG. 10 is a perspective view of a second variation high strength rear frame portion similar to the first variation frame portions; and FIG. 11 is a vertical sectional view along line 11—11 of FIG. 10 showing construction features of the second variation.

DESCRIPTION OF THE PREFERRED EMBODIMENT:

FIG. 1 illustrates an off-pavement, or so-called dirt, bicycle 10, which comprises generally a heavy-duty frame 12, including a rear wheel and drive support frame portion 14 having a front wheel fork assembly 16 pivotally mounted thereto, a rear wheel 18 conventionally mounted to the frame portion 14 and a front wheel 20 conventionally mounted to the front wheel fork assembly. Also illustrated is a typical "banana" type bicycle seat 24 mounted to an upper part of the frame portion 14 and a handlebar assembly 26 pivotally mounted to the top of the fork assembly 16. Conventional drive assembly 28 includes a crank 30 with pedals 32 and to which a front sprocket 34 is fixed, a drive chain 36 and a rear sprocket 38 over which the chain passes. A small front wheel fender 40 may be installed by attaching it to an under surface of the fork assembly 16.

The present invention is largely directed to the heavy-duty frame 12. As better seen in FIG. 2, the rear frame portion 14 of the frame 12 comprises a tubular, metal alloy main frame member 50 having an upwardly and slightly rearwardly projecting first portion 52 and an upwardly and forwardly angled second portion 54, lower ends of such portions being interconnected by an arcuate, bent intermediate portion 56 to form an entirely continuous, jointless planar structure having a general, broad V-shape. Normally, the under surface of about the middle of the intermediate portion 56 is the part of the frame 12 which is lowest to the ground (See FIG. 1).

Welded to a forward facing side of the member 50, in a region just below the transition between portions 52 and 56, is a tubular, metal alloy crank hub 60, the axis of which is orthogonal to the plane of the member 50 (FIGS. 3 and 4). Such hub 60, to which the crank 30 (FIG. 1) is journalled for rotation in a conventional manner (not shown) is thus mounted within the confines or boundaries of the member 50 and is considerably above the lowest portion of such member; it is protected thereby from damage during use of the bicycle 10 to which it is connected.

The intermediate portion 56 of the main frame member 50 functions also as a skid in the event, for example, the front wheel 20 drops into a deep rut, and prevents contact of the hub with the ground or rocks. Although under such extreme conditions damage may be done to the front sprocket 34, the sprocket may be easily replaced at a relatively low cost. Damage to a crank hub such as the hub 60, in constrast, generally requires replacement of the entire frame to which it is fixed or at least expensive frame repairing.

Also, because the hub is welded to a side portion of the continuous member 50, instead of being welded in series with parts of such a member, the frame member is not only easier to construct but is also very much stronger and less prone to cracking or breaking than conventional jointed frame assemblies heretofore used. As an example, the member 50 may be constructed from 1¼ inch outside diameter, 0.125 inch wall 6061 T6 aluminum or 0.065 inch wall carbon steel.

A rear wheel fork support 62 is welded to the rear side of the hub 60 and to the frame member 50 (FIGS. 2 and 4), and projects rearwardly. Pivotally mounted thereto, by a bolt 64, is a rear wheel fork assembly 66, which includes a rearwardly projecting first fork 67 and an upwardly and forwardly angled second fork 68, wheel support ends of both forks being welded together. Pivotally connected to an upper end portion of the second fork 68, through a selected one of several pairs of spaced mounting holes 70 provided, by a bolt 72, is the rearward end of a hydraulic/mechanical shock absorber 74 which is similar to those used in automobiles and comprises an inner hydraulic unit surrounded by a coil spring. Preferably, the shock absorber 74 includes provision for varying the hydraulic pressure so that the stiffness of its action may be easily varied to suit the rider and to accommodate riders of different weights.

A rear wheel support brace 80 is welded between forks 67 and 68 outside the rear wheel area to reinforce the rear wheel fork assembly 66.

Fixed, by welding, to an upper end of the second main frame portion 54 is an elongate, tubular metal alloy front wheel fork support socket 82, the axis of the socket being in the plane of the main frame member 50. Welded to project rearwardly from an upper end of the socket 82 is a longitudinal brace and seat support member 84 which is bent from a metal alloy tube to form a generally tear-drop shaped structure having transversely spaced side portions, and which is wider at the rearward end than at the forward end connected to the socket.

Because of the three welded frame elements — the two sides of the member 84 and the frame member portion 54 — at the socket 82, instead of the normally used two frame member joints, strength of the frame is increased and frame integrity is maintained even if one weld breaks.

Extending between adjacent portions of the upper end of the first main frame portion 52 and the member 84 is a pair of support braces 86. A pair of depending seat attaching ears 88 is welded to lower surfaces of the member 84 near the rearward end and in opposing relationship.

Attachment of the seat 24 to the frame 14 may be by means of a conventional central depending support tube or post 90 (FIG. 1) which is received in the open upper end of the first frame portion 52, and by a pair of clips 92 which secure a formed seat support rod 94 (part of the seat) to the ears 88. Alternatively, as seen in FIG. 5, a post 90a fastened to a seat 24a by a bracket 96a may be formed to curve upwardly and rearwardly, enabling generally fore and aft seat adjustment to accommodate riders of different sizes by varying the distance to the pedals 32, or to shift the center of gravity rearwardly for easier performance of "Wheelies". In addition, the end of the post 90a is directed rearwardly instead of upwardly and is therefore less likely to penetrate the seat 24a and injure the rider under severe use stresses. Double braces 98 may be used to provide added seat strength and stability.

Welded between outsides of the second frame portion 54 and the member 84, rearwardly of and near to the socket 82, is a pair of shock absorber attachment brackets 100, through which are formed several spaced pairs of mounting holes 102 (FIG. 2). The brackets 100 also function as gussets tying the member 84 and the frame portion 54 together. The forward end of the shock absorber 74 is pivotally attached, by a bolt 103, to a selected pair of these holes 102.

By selecting various of the pairs of holes 70 and 102 between which the shock absorber 74 is connected, vertical positioning of the rear wheel 18 may be varied, since the rear wheel fork assembly 66 is thereby caused to pivot to different static positions about the bolt 64. In addition, the shock absorbing characteristics can also be thereby varied, inasmuch as the effective lengths of the linkages between the pivot bolts 64 and 72 and between bolts 64 and 103 is varied.

A chain guard 104 may be provided above the sprocket 34, being connected to the frame member 50 in a conventional manner.

As seen in FIG. 6, the front wheel fork assembly 16 includes a pair of elongate spaced tubular metal alloy wheel mounting members 110 which are installed through apertures formed in upper and lower mounting plates 112 and 114, respectively, the plates being spaced apart vertically about the length of the socket 82. Where the members 110 pass through the elements 112 and 114, they are welded thereto.

In order to provide a rigid front wheel fork assembly 16 capable of withstanding severe stresses of the type encountered frequently in off-pavement use of the bicycle 10, without resorting to use of solid or very heavy walled steel tubing for the members 110 and without resorting to use of unattractively large diameter tubes for such members, reinforcing elements or girders 116 are disposed within the members 110. Preferably, the reinforcing elements 116 extend substantially the entire length (height) of the members 110, therefore requiring no means preventing their longitudinal movement. However, the elements 116 may alternatively be formed to extend only partially along the length of the members 110, from upper ends thereof, so long as the elements extend well below the lower plate 114 where maximum bending stress is encountered.

Each element 116 is easily and inexpensively constructed from a strip of metal by bending the strip along a longitudinal central axis into an elongate angle having legs 118 of equal or nearly equal length. As seen in FIG. 7, the elements 116 are formed with an angle of about 60° between the legs 118, that is, into a V-shaped angle with the apex preferably directed forwardly upon installation into the members 110. The width of the legs 118 and the angle between them is such that the elements must be slightly forced into the inside of the members 110, so that a tight, non-rotating internal fit is achieved. Because edges of the legs 118 thus fit tightly against the inside of the members 110, a rigid, composite structure is formed which is very much stronger in bending than either the member 110 or element 116 alone. In this manner, a comparatively small diameter thin wall and light weight tube can be used for the member 110. With no sacrifice of strength and with a weight and cost savings over use of larger or heavier walled tube which has heretofore been required and is also lighter in weight than tubular inserts sometimes used. As an example, the member 110, may be constructed from 1 inch outside diameter 0.125 wall 6061 T6 aluminum or 0.095 wall carbon steel.

To mount the fork assembly 16 to the socket 82, a metal alloy pivot tube 120 is provided having an axis generally parallel to those of the members 110 and positioned equidistant from both such members in a rearward position through apertures formed in the plates 112 and 114. Preferably, the lower end of the tube 120 is expanded outwardly to form a restraining flange 122. The upper end of the tube 120 is threaded externally to receive an upper retaining lock nut or collar 124 and a lower knurled collar 125. As seen in FIG. 8, the handle bar assembly 26 may be attached to the upper plate 112 by a pair of split blocks 126 bolted to the plate by bolts 128, thereby permitting the angle of the handlebars to be easily varied while providing resistance to sideways twisting in use. Alternatively, attachment of the handle bar assembly may be by means of a conventional "goose neck" post, not shown.

Assembly of the fork assembly 16 to the frame portion 14 is by removal of the nut 124 and collar 125 from the tube 120, removal of the tube from the plates 112 and 114 and positioning the socket 82 between the plates in the region of the tube mounting apertures. After the tube 120 is next inserted upwardly through the lower plate 114 and the socket 82 the collar 125 is threaded on the tube. Then after installing the tube 120 through the upper plate 112, the nut 124 is threaded onto the upper end of the tube.

Longitudinal slots 130 are formed in flattened lower ends of the members 110 for mounting of the front wheel 20 thereto (FIG. 6).

In the manner above described, an extremely rugged frame assembly 12 is provided in which the hub 60 is well protected by portions of the continuous frame member 50 and in which the reinforced front fork members 110 are light weight, yet very strong. In spite of being especially strong and rugged, the frame assembly 12 is attractive, comparatively light weight and relatively inexpensive to construct.

VARIATIONS OF FIGS. 9-11

Two variations of the rear frame portion 14 are illustrated in FIGS. 9-11, a rear frame portion 14a being shown in FIG. 9 and a rear frame portion 14b being illustrated in FIGS. 10 and 11. Both rear frame portions 14a and 14b employ frame members 50 which are substantially identical to the above described frame member 50, except that lengths of the straight first and second portions 52 and 54 may be varied, as may the angle of the bend in the portion 56. This, however, depends largely on the desired size of the frame portion and does not affect construction of the member.

In both frame portions 14a and 14b, a crank hub 60 is mounted to the member 50, as above described for the frame portion 14, as is the front wheel fork socket 82.

The principal difference between the variant frame portions 14a and 14b and the portion 14 are that no rear wheel shock absorbing, other than that due to the flexibility of the frame portions, is provided in the frame portions 14a and 14b. Instead, a rear wheel fork 67a (FIGS. 9 and 10) is welded at a forward end to the member 50 in the region of the crank 60.

In the first variation frame portion 14a (FIG. 9) the rear wheel fork 67a is braced at its rearward end by a transversely spaced pair of continuous tubular or solid elements 136. The elements 136 are welded at one end to the rear portion of the fork 67a and at a forward end, separately, to an upper portion of the socket 82. Intermediate portions of the elements 136 are welded to sides of the frame member portion 52 in an upper region thereof and are tied together in that region by a brace 137. Portions of the elements 136 rearwardly of the frame member portion 52 may be angled slightly downwardly, as shown, or may be straight.

An advantage of using the pair of elements 136 is that, including the frame portion 54, there are three elements or members of the frame 14a welded to the socket 82, instead of the usual two frame elements. This permits a greater total weld area and provides an added margin of safety against complete breaking of the frame portion 14b in the region of the socket 82 during rough use of the bicycle of which the frame portion is a part.

A gusset or gussets (not shown) may be welded between opposing sides of the elements 136, in the region of the socket 82, or elsewhere, to provide added strength, such as may be desired when the frame portion 14a is constructed of aluminum alloy materials.

FIGS. 10 and 11 illustrate the frame portion 14b, which is similar to the frame portion 14a above described, having a fixed rear fork portion 67a, except that the elements 136 are replaced by a pair of rear fork brace elements 138, which are welded between rear ends of the fork 67a and the frame member portion 52, and a contoured channel member 140 which is welded between the frame member portion 52 and the socket 82. A forward portion 142 of the channel member 140 extend downwardly into engagement with the frame member portion 54 and is welded thereto to provide added strength at the socket 82, such as may be desired for aluminum frame construction.

The elements 138 and member 140 may terminate at the frame member portion 52 or may be overlapped and welded together for added strength. As shown in FIG. 11, the channel member 140 is flanged downwardly to form a smoothly contoured exposed upper surface. A number of holes 144 may be formed in the channel member forward portion 142 in a decorative pattern.

Both frame portions 14a and 14b are constructed for use with the above described front fork assembly 16, seat 24, etc.

Although there has been described above specific arrangements of a heavy duty dirt bicycle and frame therefor in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to within the scope of the invention as defined in the appended claims.

What is claimed is:

1. A heavy-duty bicycle which comprises:
   a. front and rear wheels,
   b. handlebars,
   c. a bicycle seat,
   d. frame means for mounting said front and rear wheels, said handlebars and said seat, said frame means including a continuous main frame member, said member having an elongate, upwardly and rearwardly projecting first portion, an elongate upwardly and forwardly projecting second portion and an arcuate intermediate portion joining lower ends of the first and second portions into a planar, generally broad V-shaped structure,
      a front wheel fork swivel socket and means fixing the socket to an upper end of the second main frame portion, the axis of the socket being in the plane of the frame member,
      a front wheel fork having a pivot tube pivotally received by the swivel socket, and having a pair of mutually spaced, opposing elongate tubular front wheel mounting members, and including reinforcing elements disposed within at least upper portions of the mounting members,
      the reinforcing elements each comprising an elongate formed metal angle configured to tightly engage inner surfaces of the mounting members when inserted thereinto, thereby being retained in the installed position by spring action of the angle, the angle formed by the legs of the reinforcing elements being about 60° and wherein, upon installation, the apexes of the elements are directed generally forwardly.
   e. drive means cooperating with said frame means for causing movement of the bicycle, said drive means including a pedal crank hub, and
   f. means joining said hub to a generally forward facing surface of the said main frame member relatively adjacent the intersection of the first and intermediate portions and relatively remote from a lowest point of the intermediate portion, with the axis of the hub orthogonal to the plane of the frame member, the hub being thereby positioned within the boundaries of the frame member and being protected thereby from damage during use of the bicycle.

* * * * *